May 3, 1938. F. G. URBAN 2,115,832
FRUIT CORE EXTRACTOR
Filed Sept. 30, 1936
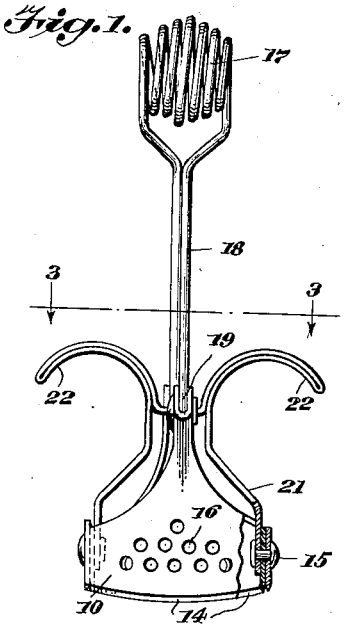
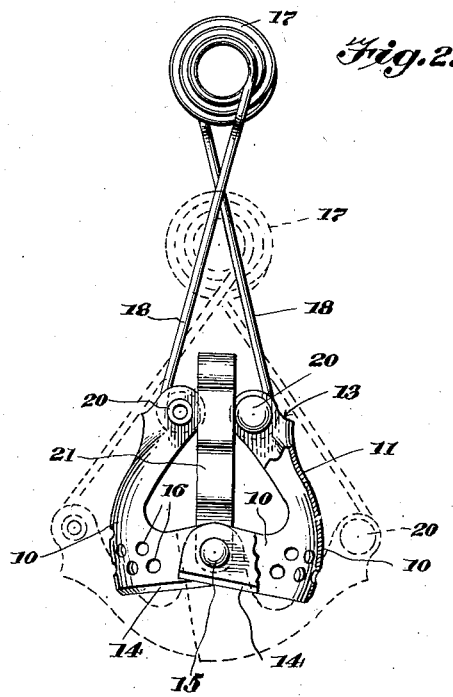
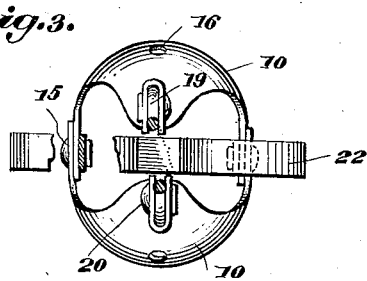
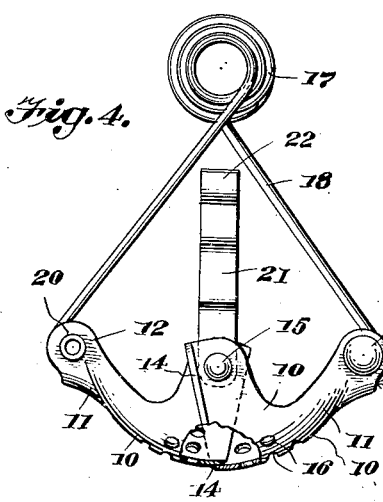
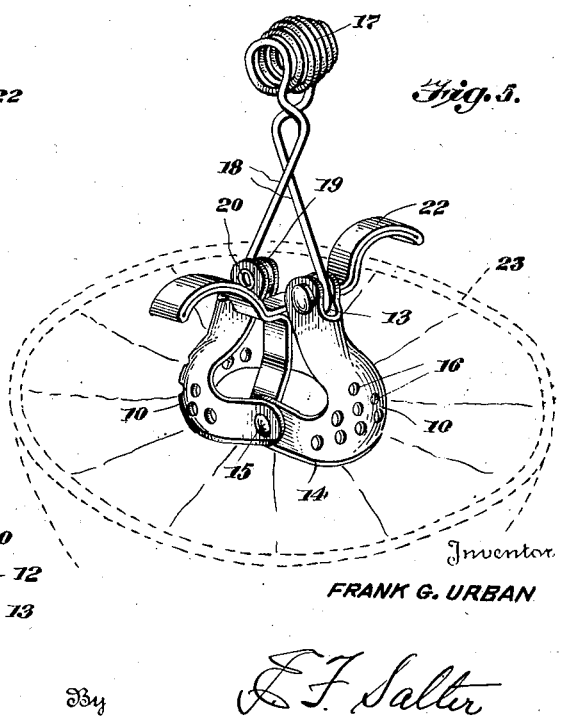
Inventor
FRANK G. URBAN
By E. F. Salter
Attorney Patented May 3, 1938

2,115,832

UNITED STATES PATENT OFFICE 2,115,832

FRUIT CORE EXTRACTOR

Frank G. Urban, Morristown, N. J.

Application September 30, 1936, Serial No. 103,438

11 Claims. (Cl. 30—25)

This invention relates to improvements in coring devices of the type used for removing the cores or seeds of fruits such as grapefruit or the like, although not necessarily restricted to this use.

An important object of this invention is the provision of a device of this character which may be operated with one hand, which will cleanly and effectively remove the cores of fruits or the like without mashing the fruit or removing the juices, which is of simple construction and which may be made at a very low cost.

A further object of the invention is to provide a device of this character which has a minimum number of parts, which is simple and positive in operation and which will have a long life.

Other objects and advantages of the invention will be apparent during the course of the following description.

In the accompanying drawing which forms a part of this specification, and wherein like characters of reference denote like parts throughout, Figure 1 is a front elevation of a device embodying the present invention, parts being broken away, Figure 2 is a side elevation thereof, showing the coring position of the parts in dotted lines, Figure 3 is a top plan view of the device, parts being broken away, Figure 4 is a side elevation thereof showing the coring position, and, Figure 5 is a perspective view showing the device in position ready for use.

In the drawing, wherein for the purpose of illustration is shown a preferred embodiment of the invention, the numeral 10 designates complementary cutting members which are formed of metal, preferably steel, and which are shown as semi-elliptical in transverse section. These cutting members may obviously be of semi-cylindrical cross-section if desired but the elliptical formation is preferred in order to produce the desired cutting depth and cutting action. The blanks from which the cutting members or sections 10 are formed will be of substantially inverted T-shape and will be curved upon themselves to produce the semi-elliptical form seen in Figure 3. The lever arms 11 formed by the vertical portion of each T blank are also curved and at their upper portions are bent upon themselves to form parallel ears 12 separated by a slot 13 and spaced a slight distance apart. The lower edges of the cutting members 10 are chamfered or ground to produce sharpened cutting edges 14 and the ends of the cutting members overlap and are pivotally secured together by pivot pins or the like 15.

It will be seen by reference to Figure 2 that the cutting sections 10 are curved longitudinally as well as transversely and that this curvature is carried to the cutting edges 14. The longitudinal curvature produces a somewhat cup-shape and these cupped portions of the sections 10 are provided above the cutting edges with a plurality of apertures or perforations 16.

Due to the longitudinal curvature of the cutting sections 10, the upper portions of the arms 11 will in normal position be disposed in proximity to each other, as indicated in Figures 2, 3, and 5. A handle is formed by a spring coil 17 the opposite end portions of which extend away from the coil 17 for a substantial distance to form crossed push rods 18 which are bent upon themselves at their ends to form eyelets which are disposed between the ears 12 of the arms 11 to which they are pivotally secured by pivot pins 20. The arms 11 and ears 12 are preferably arranged slightly out of alinement, as indicated in Figures 1 and 3 to allow for the crossing of the spring push rods 18. The member 17 is preferably a coil spring but other types of springs, such as a flat tempered steel spring, may be employed.

A finger operating frame 21 may be formed from a single strip of metal having its ends secured to pivot pins 15, and extends upwardly between arms 11 to a point adjacent the ears 12 where it is bent upon itself to form laterally projecting curved finger wings 22.

In operation, the device is grasped in the hand with the coil 17 disposed against the palm and with two fingers of the hand engaging the curved lateral wings 22. The cutting edges 14 are then positioned to surround the core of the fruit 23 as indicated in Figure 5 by pressing down on the handle coil, and at the desired depth of cut the fingers of the hand are drawn upwardly with the wings 22. This action raises the pivots 15, pulling the cutting edges 14 together and separating arms 11 against the tension of the spring coil 17. When the finger frame 21 is raised to its fullest extent the cutting members 10 will have cut out the core of the fruit and will be in the slightly overlapping position shown in full lines in Figure 4 and in dotted lines in Figure 2. In this position the two cutter members form a somewhat cup-shaped receptacle in which the cut out core rests, while any juices are free to pass out through the apertures 16 back to the fruit. When the grip on the wings 22 is relaxed, spring 17 and rods 18 return the arms 11 to their original position permitting the core to drop from between the members 10.

In place of grasping the device between the palm of the hand and the fingers, it may be grasped between two fingers and thumb, the thumb engaging the coil 17.

The coil 17 is arranged with its convolutions closely disposed and of decreasing diameter towards the ends of the coil to produce a coil member which may be readily held against the palm or thumb. The longitudinal curvature of the cutting sections 10 not only forms the desired cup shape in the position seen in Figure 4 to hold the core and facilitate the escape of the juices but it also enhances the effectiveness of the cutting operation by disposing the cutting edges 14 at a more effective angle with respect to the path in which the cutting edges move about the pivots 15.

As best shown in Figures 2 and 5, the bridge piece of the finger frame 21 normally is engaged at its opposite side edges by the pivot carrying upper ends of the arms 11, whereby said ends are held in spaced relation against tension of the spring rods 18 so that they cannot bind together in the axis of the implement as they would tend to do, by reason of their mutual offset, unless held apart. Further, as will be seen from Figure 5, the upper curved extremities of the arms 11 partially override the finger piece bridge so that in a downward axial thrust of the implement the force is transmitted axially through the finger frame to the pivot connections 15 between the cutter sections, preventing any possibility of the pivots 15 being forced inwardly by resistance of the body being cored. The pivoted connections 15 provide break joints whereof the finger frame 21 constitutes the actuator means. These joints cannot be broken until the finger frame is given positive movement by an inward pull axially of the implement.

It will be seen that I have provided an efficient coring device formed with few and simple parts which may be produced and assembled at a very small cost. The device will have a long life as there are no parts subject to great strain or wear.

While I have shown and described the preferred embodiment of my invention, it is to be understood that various changes in the size, shape and arrangement of parts may be resorted to without departing from the spirit of my invention or the scope of the subjoined claims.

Having thus described my invention, what I claim and desire to protect by Letters Patent is:

1. A coring device comprising a pair of complementary cutting sections directly pivotally connected to each other, a lever arm carried by each cutting section, a resilient member pivotally secured at one end to one of the lever arms and at the other end to the other lever arm, said resilient member acting to resist movement of said lever arms apart, and means to separate said lever arms against the tension of said resilient member.

2. A coring device comprising a pair of complementary cutting sections directly pivotally connected to each other, a lever arm carried by each cutting section, a resilient member having thrust transmitting arms pivotally secured to the lever arms and normally urging the lever arms together, and means to separate the lever arms against the tension of said resilient member.

3. A coring device comprising a pair of complementary cutting sections directly pivotally connected to each other, a lever arm carried by each cutting section, a resilient member having thrust transmitting arms pivotally secured to the lever arms and normally urging the lever arms together, and means to separate the lever arms against the tension of said resilient member, said resilient member having a handle portion extending longitudinally beyond the lever arms.

4. A coring device comprising a pair of complementary cutting sections directly pivotally connected to each other, a lever arm carried by each cutting section, a resilient member pivotally connected at one end to one of the lever arms and at the other end to the other lever arm, said resilient member acting to resist movement of said lever arms apart, and means to separate said lever arms against the tension of said resilient member, said resilient member having a handle portion extending longitudinally beyond the lever arms.

5. A coring device comprising a pair of pivoted cutting sections, a pair of crossed rods each of which is pivotally connected at one end to a cutting section, resilient means operatively connecting the rods adjacent their other ends to resist pivotal movement of the cutting sections, and means directly connected to the section pivots to move the cutting sections against the tension of said resilient means.

6. A coring device comprising a pair of pivotally connected complementary sections having a transverse curvature providing a substantially annular cutting edge to surround a fruit core, a finger grip engaging the pivotal connection of the cutting sections, a pair of crossed rods each of which is pivotally connected at one end to a cutting section, and a spring coil connecting the other ends of the rods and resisting movement of the cutting sections about their pivots.

7. A coring device comprising a pair of pivotally connected complementary sections having a transverse curvature providing a substantially annular cutting edge to surround a fruit core, a finger grip engaging the pivotal connection of the cutting sections, a pair of crossed rods each of which is pivotally connected at one end to a cutting section, and a spring coil connecting the other ends of the rods and resisting movement of the cutting sections about their pivots, said spring coil serving as a hand grip for operating the cutting sections.

8. A coring device comprising a pair of pivotally connected complementary cutting sections having a transverse curvature to provide a substantially annular cutting edge, said cutting sections having a longitudinal curvature extending to their cutting edges, there being a plurality of apertures in the cutting sections in the vicinity of their cutting edges, push rods pivotally engaging the sections to move them about their pivots, and resilient means connecting said push rods and resisting pivotal movement of the cutting sections.

9. A coring device comprising a pair of pivotally connected complementary cutting sections having a transverse curvature to provide a substantially annular cutting edge, said cutting sections having a longitudinal curvature extending to their cutting edges, there being a plurality of apertures in the cutting sections, lever arms carried by the cutting sections, a finger grip secured to the pivotal connection of the sections, a pair of rods pivotally engaging the lever arms and extending longitudinally away therefrom, said rods crossing each other, and a spring coil connecting the rods to resist movement of the cutting sections about their pivotal connection.

10. A coring device comprising a pivotally connected pair of complementary cutting sections, a lever arm carried by each cutting section, resilient means connected to said lever arms and normally urging the same together, and a cutting section actuator member having direct attachment to the pivotal connection between the cutting sections, said actuator member having a portion thereof disposed between said lever arms to maintain same in spaced relation against tension of said resilient means.

11. A coring device comprising a pair of complementary cutting sections having a pivotal connection therebetween, a lever arm carried by each cutting section axially inward of the device, a thrust handle member in opertaive connection with the inner ends of said lever arms and having resilient means normally urging said lever arms together, a cutting section actuator member movable axially of the device and pivotally connected to the pivotal connection between the cutting sections, and said actuator member having a portion disposed between said lever arms and spacing the same against tension of said resilient means and engaging said lever arms in a manner to transmit axial thrust of said handle member to the pivotal connection between said cutting sections.

FRANK G. URBAN.